US005524754A

United States Patent [19]
Hollingsworth

[11] Patent Number: 5,524,754
[45] Date of Patent: * Jun. 11, 1996

[54] CARRYING CASE FOR NOTEBOOK COMPUTER

[75] Inventor: W. Dale Hollingsworth, Wilton, Conn.

[73] Assignee: Port, Incorporated, Norwalk, Conn.

[ * ] Notice: The portion of the term of this patent subsequent to Jun. 4, 2012, has been disclaimed.

[21] Appl. No.: 246,244

[22] Filed: May 19, 1994

[51] Int. Cl.⁶ .................................................. B65D 85/38
[52] U.S. Cl. ........................ 206/320; 206/305; 206/583; 190/111
[58] Field of Search ................................... 206/305, 320, 206/576, 583; 150/111–117; 190/110–111

[56] References Cited

U.S. PATENT DOCUMENTS

| | | |
|---|---|---|
| 1,721,427 | 7/1929 | Aldrich . |
| 2,018,605 | 10/1935 | Craig . |
| 2,335,779 | 11/1943 | Mazzei . |
| 2,653,709 | 9/1953 | Cunningham et al. . |
| 2,681,142 | 6/1954 | Cohen . |
| 2,696,322 | 12/1954 | Densen . |
| 2,700,460 | 1/1955 | Hoover . |
| 2,700,518 | 1/1955 | Ryno et al. . |
| 2,771,184 | 11/1956 | Ryno et al. . |
| 2,785,795 | 3/1957 | Ryno et al. . |
| 2,837,208 | 6/1958 | Lingenfelter . |
| 3,176,742 | 4/1965 | Kubnick . |
| 3,185,198 | 5/1965 | Bryan . |
| 3,192,978 | 7/1965 | Horvath . |
| 3,752,301 | 8/1973 | Bluemel . |
| 3,853,220 | 12/1974 | Luray . |
| 4,013,170 | 3/1977 | Hutterer . |
| 4,117,933 | 10/1978 | Lachance . |
| 4,378,866 | 4/1983 | Pelavin . |
| 4,664,254 | 5/1987 | Sitwell et al. . |
| 4,685,571 | 8/1987 | Hoss . |
| 4,735,320 | 4/1988 | Hoss . |
| 4,837,590 | 6/1989 | Spraque . |
| 4,919,240 | 4/1990 | Tobias . |
| 4,946,036 | 8/1990 | Kupersmit . |
| 5,010,988 | 4/1991 | Brown . |
| 5,056,665 | 10/1991 | Boecker et al. . |
| 5,105,920 | 4/1992 | Grebenstein . |
| 5,160,001 | 11/1992 | Marceau . |
| 5,211,290 | 5/1993 | Janus et al. . |
| 5,217,119 | 6/1993 | Hollingsworth . |
| 5,226,542 | 7/1993 | Boecker et al. . |

FOREIGN PATENT DOCUMENTS

| | | |
|---|---|---|
| 2391668 | 12/1978 | France . |
| 4234581 | 4/1993 | Germany . |
| 135796 | 11/1978 | Japan . |
| 303273 | 6/1971 | U.S.S.R. . |
| 182047 | 7/1976 | U.S.S.R. . |
| 1150172 | 4/1985 | U.S.S.R. . |
| 1638073 | 3/1991 | U.S.S.R. . |
| 146601 | 7/1920 | United Kingdom . |

OTHER PUBLICATIONS

Macworld, Apr. 1993, "Port™: the best cradle for your powerbook" (1 Page).

Primary Examiner—Jimmy G. Foster

[57] ABSTRACT

A carrying case for electronic equipment such as a notebook computer includes a pair of opposed walls, a plurality of side walls connected therebetween to define a principal compartment for receiving the notebook computer, and a suspension member affixed to an upper portion of one of the opposed walls and depending downwardly therefrom into the principal compartment. The suspension member includes upper and lower supports to cradle the notebook computer and an elastic panel disposed between the upper and lower supports to absorb any shock which would otherwise occur due to the carrying case being abruptly dropped. Alternatively, the suspension member can be an elastic panel having opposed ends supported by an upper portion of one of the opposed walls to define an elastic sling which depends downwardly from the wall within the principal compartment to receive the notebook computer. The suspension member can also be releasably connected between the opposed walls to define a shock absorbing cradle which can be removed so that the carrying case can be used for other purposes.

25 Claims, 7 Drawing Sheets

CARRYING CASE FOR NOTEBOOK COMPUTER

BACKGROUND OF THE INVENTION

1. Field of the Invention

The present invention relates generally to a carrying case, and more particularly, to a carrying case for securely transporting a delicate electronic instrument such as a notebook computer.

2. Description of the Background Art

"Laptop" and "notebook" computers, that is, personal computers so reduced in size and weight as to be conveniently carried and employed while traveling, have enjoyed widespread acceptance of late. Unfortunately, it is difficult to make notebook computers compact while at the same time making them rugged enough to withstand being dropped or otherwise subjected to shock loading. The small size of today's notebook computers leaves little or no room inside for shock absorbing materials to protect the vulnerable parts of the computer, such as the LCD screen, the hard drive, the plastic outer case, and the various connectors.

The effect of being dropped or hit is measured in G's, which represents an acceleration of 32 feet/sec$^2$. Each computer manufacturer's design is different, so there is no universally safe level of shock for notebook computer cases and connectors. However, the manufacturers of hard drives typically specify that their drives can withstand shocks in the range of 75 to 200 G. The manufacturers of LCD screens, on the other hand, guarantee their screens to withstand shocks of only about 50 G, a level which can be reached by dropping a notebook computer from a height of only six inches. Since carrying cases for notebook computers are usually hand held or hung from shoulder straps more than six inches from the ground, it is important that they provide adequate protection from the falls and bumps typically encountered in every day use.

Most manufacturers of carrying cases for notebook computers incorporate into their cases foam padding ranging in thickness from about one-half to about three inches. Foam padding will protect the computer until completely compressed, which is typically half of the thickness of the foam pad. Thus, three inches of padding will protect a computer only through a distance of about one and a half inches. Tests have shown that in carrying cases provided with two inches of foam padding, the 50 G threshold for LCD screens is exceeded in drops from as little as eight inches.

A carrying case offering superior protection against shocks is disclosed in U.S. Pat. No. 5,217,119 and is marketed by PORT Computer Cases of South Norwalk, Conn. The case includes a suspension system which uses an elastic sling construction built into the case. The computer is protected within the sling through the full distance of the fall, without resting on a foam barrier. The empty space below the sling, to the bottom of the case, provides twice as much protection as an equivalent amount of foam rubber padding.

SUMMARY OF THE INVENTION

Accordingly, it is a primary object of the present invention to provide a carrying case for a notebook computer having a suspension system depending from one wall of the case to elastically support and protect the computer during transport while allowing the computer to be used without being removed from the case.

It is a further object of the present invention to provide a carrying case for a notebook computer having a removable suspension system affixed to opposed walls of the case to define a shock absorbing cradle for receiving a notebook computer and to facilitate conversion of the carrying case for other uses.

It is yet another object of the present invention to provide a carrying case for a notebook computer having a suspension system which depends from one wall of the case and is selectively adjustable in depth to elastically support and protect notebook computers or other sensitive instruments of various sizes and weight during transport.

Some advantages of the present invention over the prior art include the ability to use the computer within the carrying case, for example when there is no room to stow the case separately from the computer, that the suspension system of the present carrying case can be adjusted to accommodate computers and other objects of varying size and weight, and that the suspension system may by removed from the case to make another compartment available for transporting more rugged objects.

The present invention is generally characterized in a carrying case for a notebook computer having a pair of opposed walls, a plurality of side walls connected between the opposed walls to define therebetween a principal compartment for receiving the notebook computer, and a suspension system affixed to an upper portion of one of the opposed walls. The suspension system depends downwardly from the wall into the principal compartment and includes upper and lower supports to cradle the notebook computer, and an elastic panel disposed between the upper and lower supports. The upper support is preferably a panel carrying two laterally spaced brackets for cradling corners of the notebook computer, each bracket including a base and two perpendicularly extending flanges to bear against adjacent sides of a corner of the computer. In order to accommodate various sizes of computer, the brackets are attached to the upper support using hook-and-loop fasteners or the like. The lower support is preferably also a panel carrying at least one perpendicularly extending tab to support a bottom edge of the notebook computer. An adjustable strap holds the notebook computer in place between the upper and lower supports.

Another aspect of the present invention is characterized in a carrying case for a notebook computer having a pair of opposed walls, a plurality of side walls connected between the opposed walls to define a primary compartment for receiving the notebook computer, and a suspension system affixed to an upper portion of one of the opposed walls and depending downwardly from the wall within the principal compartment to form an elastic sling, one end of which is fixed to the upper portion of the wall, and the other end of which is releasably fastened to the upper portion of the wall to define a pouch for receiving the notebook computer. The detachable end of the sling may, for example, be fastened to the wall using one or more pairs of mating straps provided with cooperating clasps or buckles.

Yet another aspect of the present invention is characterized in a carrying case for a notebook computer having a pair of opposed walls, a plurality of side walls connected between the opposed walls to define a primary compartment for receiving the notebook computer, and a suspension system releasably affixed between the opposed walls and depending downward therefrom within the principal compartment. The suspension system includes an elastic panel releasably connected between the opposed walls to define a shock absorbing cradle for receiving a notebook computer. The suspension system can also be carried by a pair of stiffening inserts each of which is releasably connected to a respective one of the opposed walls to support the elastic panel therebetween.

Other objects and advantages of the present invention will become apparent from the following description of the preferred embodiments taken in conjunction with the accompanying drawings wherein like parts in each of the several figures are identified by the same reference characters.

DESCRIPTION OF THE PREFERRED EMBODIMENTS

Figure 1:
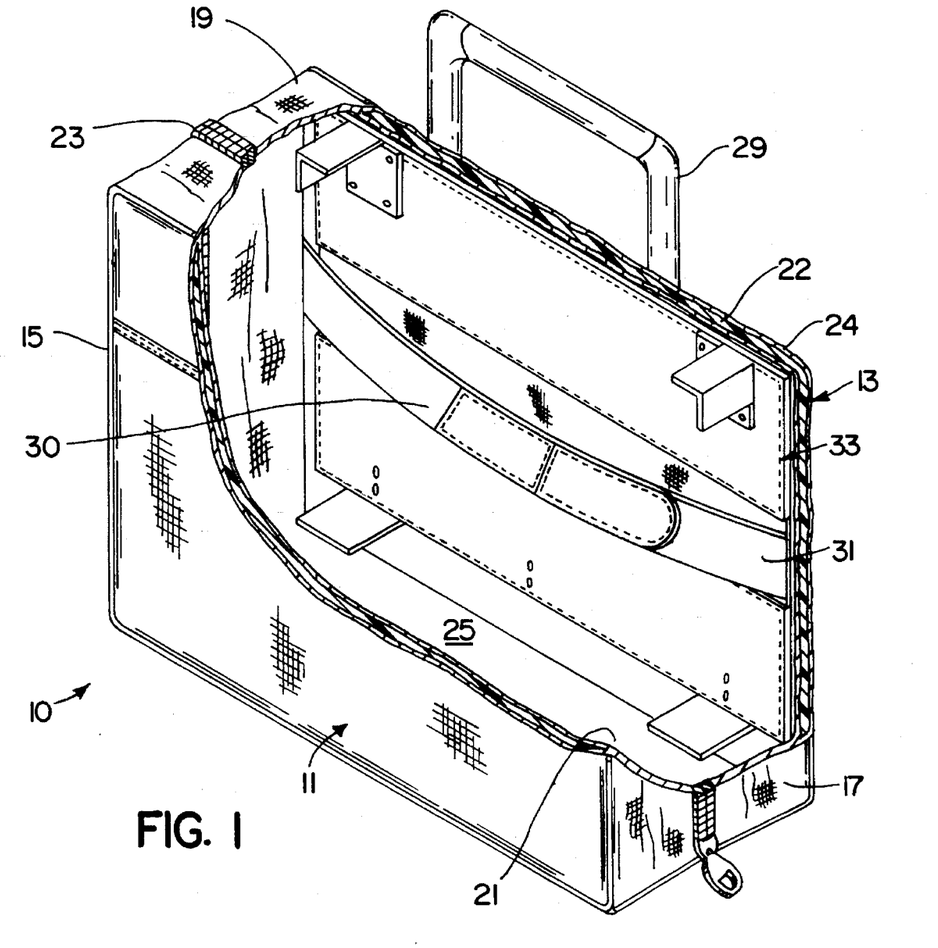
FIG. 1 is a perspective view of a carrying case according to the present invention in a closed condition with a cutaway to show the suspension system disposed therein.
Figure 2:
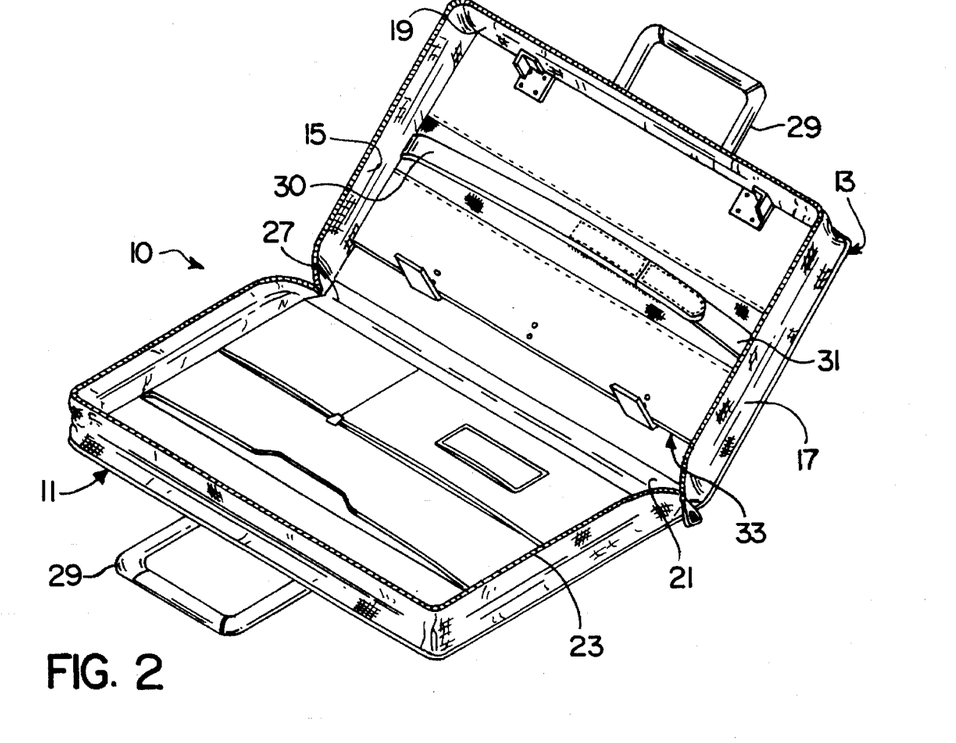
FIG. 2 is a perspective view of the carrying case of FIG. 1 in an opened condition.

Referring to FIGS. 1 and 2 in greater detail, the carrying case 10 according to the present invention includes a front wall 11, back wall 13, left and right side walls 15 and 17, and top and bottom side walls 19 and 21. Side walls 15, 17, 19 and 21 extend between front wall 11 and back wall 13 to form a generally rectangular frame with a zippered opening 23 intermediate front and back edges of the left, right and top sidewalls 15, 17 and 19 to selectively close or open the case 10. In the closed condition shown in FIG. 1, front wall 11, back wall 13, left and right side walls 15 and 17, and top and bottom side walls 19 and 21 cooperate to define a primary compartment 25 for receiving a laptop, notebook, or sub-notebook computer or other delicate object to be carried. Two handles 29 are attached to front and back walls 11 and 13, respectively, and form elevated loops for grasping with one hand to transport the case 10. Additionally, bottom side wall 21 includes a flexible region or hinge 27 to allow pivoting of the front wall 11 away from the back wall 13 when zippered opening 23 is divided and the case 10 is in an opened condition as shown in FIG. 2. Front and back walls 11 and 13, left and right side walls 15 and 17, and top and bottom side walls 19 and 21 can have any desired configuration defining a compartment suitable in size for holding a notebook computer or the like, and as thus far described, form a conventional carrying case of the type commonly referred to as an attache or portfolio. Such cases are usually fabricated of leather or a synthetic fabric, such as ballistic nylon, and typically include stiffening panels 22 which are padded and encased by the fabric material 24 which forms an outer covering for the carrying case 10. In the carrying case shown in FIGS. 1–2, hinge 27 is also integrally formed of the covering material 24.

In accordance with the present invention, a suspension system 33 is mounted on the back wall 13 and, together with mating strap members 30 and 31, holds and protects a notebook computer from otherwise destructive shocks. Mating strap members 30 and 31 are preferably nylon belts with cooperating strips of hook-and-loop fasteners, of the type known in the art for holding a notebook computer within a carrying case, and extend respectively from left and right side walls 15 and 17 to surround the suspension system 33.

Figure 3:
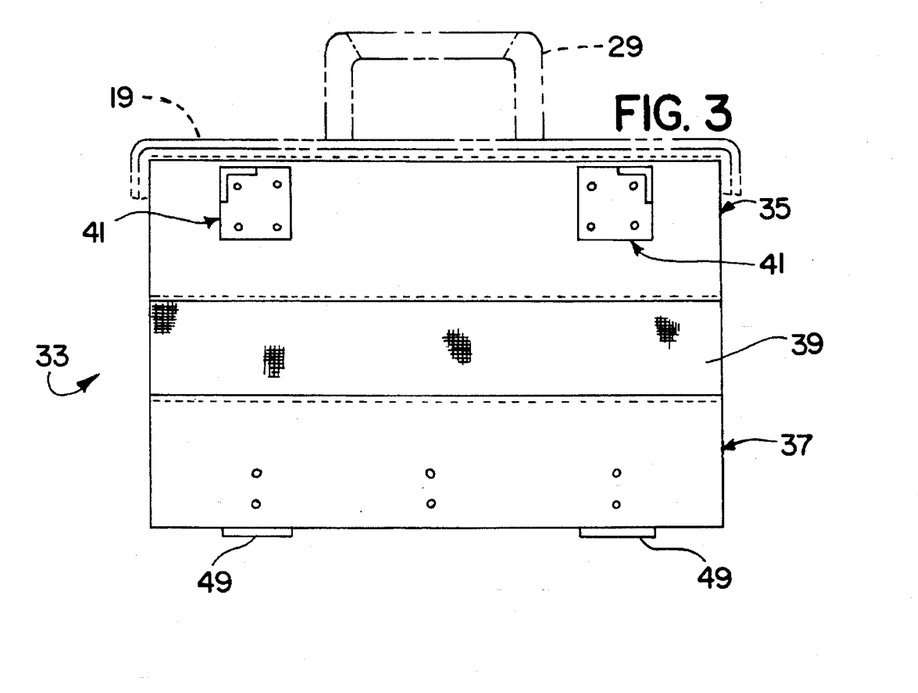
FIG. 3 is a frontal view of the suspension system shown in FIGS. 1 and 2.
Figures 4, 5, 6, 7:
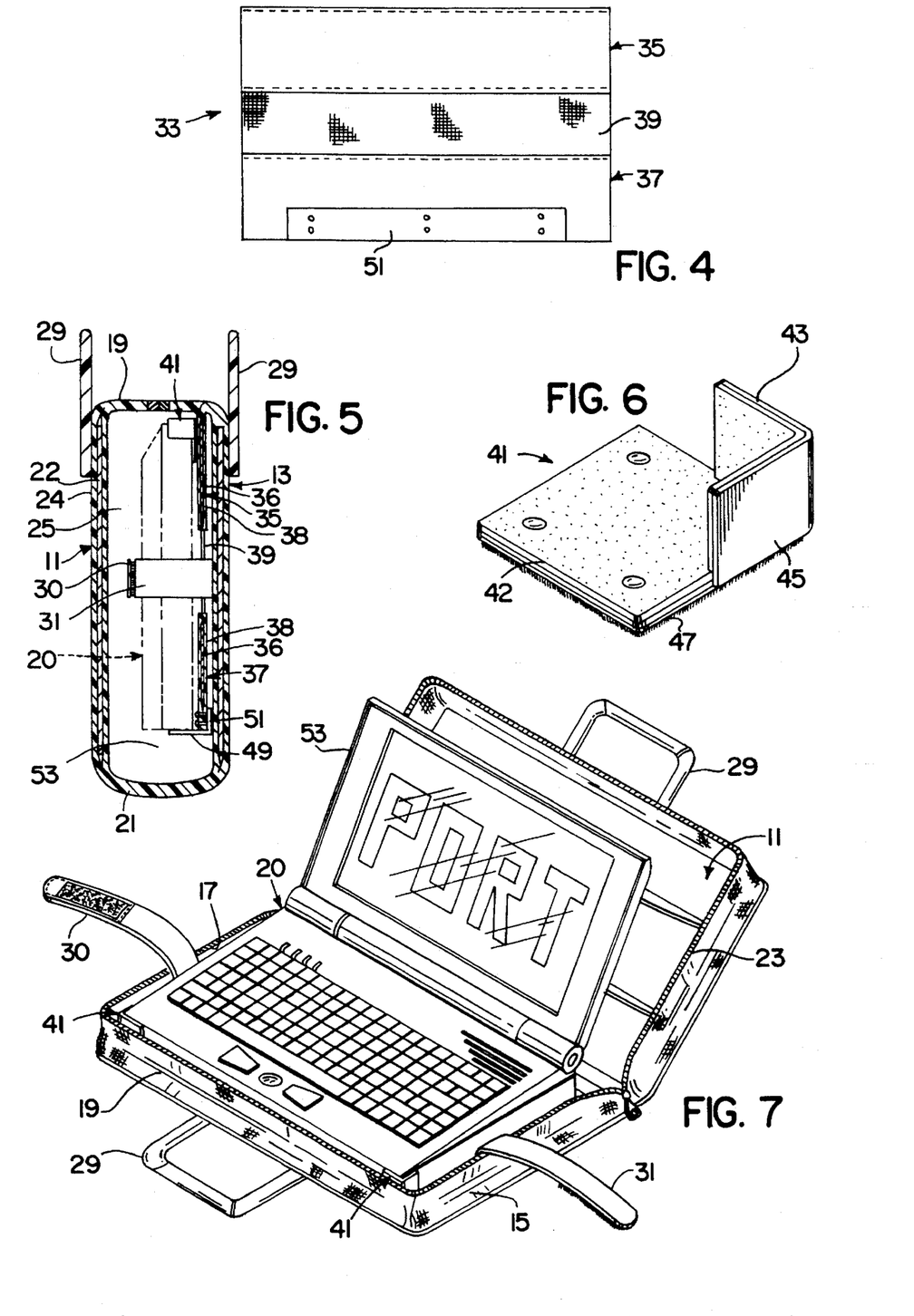
FIG. 4 is a rear view of the suspension system shown in FIGS. 1 and 2.
FIG. 5 is a side view, partly in section, of the carrying case of FIG. 1 with a notebook computer suspended therein.
FIG. 6 is an enlarged perspective view of a bracket for use in the suspension system shown in FIGS. 1 and 2.
FIG. 7 is a perspective view illustrating use of the carrying case of FIG. 1 to facilitate operation of a notebook computer held therein.

As best seen in FIGS. 3–5, suspension system 33 includes a hinged panel 35, a movable panel 37 and an elastic panel 39 connected between the hinged and movable panels 35 and 37. Hinged panel 35 is hung from an upper portion of back wall 13, so that suspension system 33 depends downwardly from back wall 13 into the primary compartment 25 like a flap. Hinged and movable panels 35 and 37 each include a rigid or semi-rigid rectangular stiffener 36 encased in a fabric covering 38, such as cloth, and are sewn or affixed in any conventional manner to elastic panel 39. Elastic panel 39 is made of any resilient material, but is preferably a knitted fabric comprising elastic fibers or strands, such as 0.125 inch thick woven, elastic neoprene fabric.

The hinged panel 35 carries two laterally spaced brackets 41, shown in detail in FIG. 6, which are selectively positionable to cradle corners of a notebook computer or the like and include a base 42 and two perpendicularly extending flanges 43 and 45 to bear against adjacent sides of a corner of a notebook computer. Each bracket 41 is advantageously provided with a hook-and-loop fastener 47 on a bottom side of the base 42 to couple with the fabric covering 38 of panel 35, so that the laterally spaced brackets 41 may be removably positioned to accommodate notebook computers of various shapes and sizes. Perpendicularly extending tabs 49 are provided on movable panel 37 and face away from back wall 13 to support the bottom edge of the notebook computer, and are formed of sheet metal which is shaped to form an elongated back plate 51 and two perpendicularly extending tabs 49. Back plate 51 is secured to panel 37 with rivets or using other known fastening techniques.

In use, the carrying case 10 is opened by disengaging zippered opening 23 and pivoting front wall 11 away from back wall 13. With back wall 13 resting on a horizontal surface, a computer 20 is placed on top of the suspension system 33 between brackets 41 and tabs 49 with the computer cover facing upward, away from back wall 13 as shown in FIG. 7. If the computer 20 is loosely fitted or unable to fit between brackets 41 and tabs 49, brackets 41 may be removed from hinged panel 35 and suitably repositioned for a proper fit. Once the computer 20 is properly positioned on top of suspension system 33, strap members 30 and 31 are folded over the computer to mate at a position intermediate the left and right side walls 15 and 17, holding the computer 20 against the suspension system 33. To transport the computer 20 within the case 10, the zippered opening 23 is closed and the handles 29 grasped with one hand for carrying.

As more particularly shown in FIG. 5, with carrying case 10 in an upright position, the notebook computer 20 is held vertically between brackets 41 and tabs 49 of the suspension system 33 while strapped in place with mating strap members 30 and 31. Front and back walls 11 and 13 and bottom wall 21 cooperate to define an open space 53 beneath the computer 20 through which the computer 20 may travel in the event the carrying case 10 is dropped. The elastic characteristics and dimensions of the elastic panel 39 are chosen so that a bottommost surface or edge of the notebook computer 20 disposed between the brackets 41 and tabs 49 is normally spaced above the bottom wall 21. That is, elastic panel 39 is chosen such that the weight of the notebook computer 20 is insufficient to stretch the panel 39 to the point that a lower surface of the computer 20 or tabs 49 contacts the bottom wall 21 under normal circumstances. Preferably a clearance of about three inches remains when a notebook computer of typical weight (e.g., about 6 pounds) is placed in the suspension system 33. In this way, if the carrying case 10 with notebook computer 20 disposed therein is set down roughly, as might typically occur during travel, elastic panel 39 is capable of stretching to absorb the shock and impact otherwise experienced by the computer 20. In other words, by carrying the notebook computer 20 on suspension system 33 including resilient elastic panel 39, the elastic panel 39 can stretch as needed to absorb the kinetic energy of the notebook computer 20, thereby cushioning it, and absorbing any shock which would otherwise occur due to the carrying case being abruptly set down.

The weight of notebook computer 20 on tabs 49 is borne primarily by back wall 13, so that in order for back wall 13 to withstand the loads occurring when the case is set down, it is preferred that back wall 13 be strengthened by stiffening panels 22 or a rigid frame. If stiffening panels 22 are used, these will further protect the notebook computer 20 against side impacts from the corners of furniture, sharp instruments, or the like when it is carried.

Access to notebook computer 20 can be had without removing the computer 20 from carrying case 10, by laying the back wall 13 on a horizontal surface such as a desk or the user's lap, disengaging the zippered opening 23 and pivoting the front wall 11 away from left and right side walls 15 and 17 and top side wall 19, as shown in FIG. 7. Since suspension system 33 comprises an essentially flat surface or flap beneath notebook computer 20, separation of mating strap members 30 and 31 allows the cover 53 of notebook computer 20 to be opened while the computer remains within carrying case 10. If front wall 11 is provided with file folders, pockets and other compartments, the computer user will have convenient access both to paperwork contained within the carrying case 10 and the computing capabilities of the notebook computer 20. This feature is particularly useful when traveling by air, since carry-on luggage must often be stowed in locations rendering such paperwork inaccessible if the notebook computer 20 had to be removed from its carrying case and the case stowed beneath a seat or in an overhead compartment. Additionally, carrying case 10 provides a more stable working surface than the user's knees upon which to operate the notebook computer 20.

Figure 8:
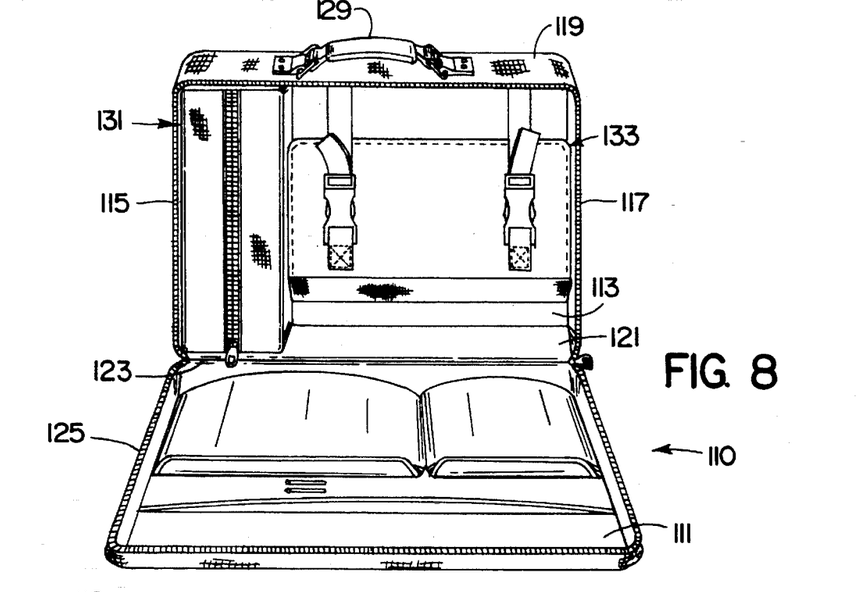
FIG. 8 is a frontal perspective view of a modified carrying case according to the present invention in an opened condition.
Figures 9, 10, 11:
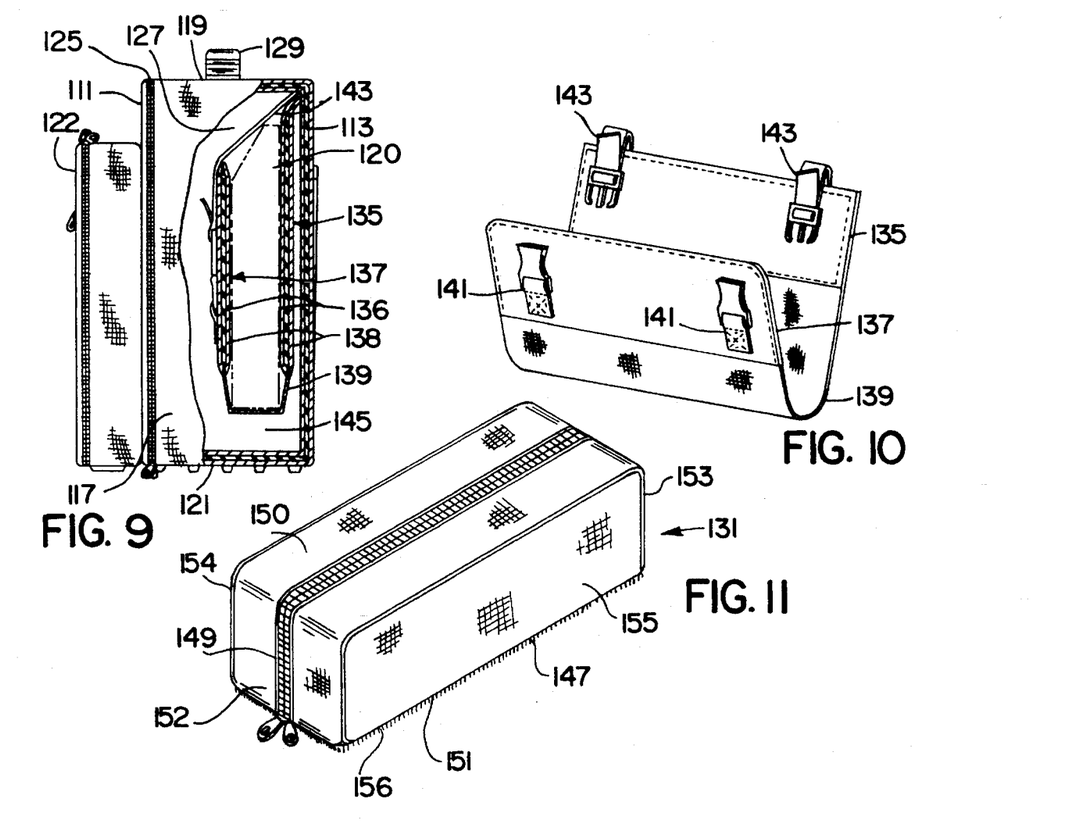
FIG. 9 is a side view of the carrying case of FIG. 8 in a closed condition with a notebook computer suspended therein.
FIG. 10 is a perspective view of the suspension system shown in FIG. 8 with pairs of mating strap members detached.
FIG. 11 is an enlarged perspective view of the elongate container shown in FIG. 8.

A modification of the carrying case of the present invention, shown in FIGS. 8 and 9, differs primarily in the way the computer is suspended from the back wall. The carrying case 110 includes front and back walls 111 and 113, left and right side walls 115 and 117, and top and bottom side walls 119 and 121. Back wall 113 and side walls 115, 117 and 119 are stiffened in any conventional manner. Front wall 111 is padded and carries a zippered outer pocket 122 for additional storage. A hinge 123 provides a pivoting connection between front wall 111 and back wall 113 so that carrying case 110 may be selectively opened or closed through the use of a zippered opening 125 disposed intermediate the front and back walls 111 and 113. When closed, as shown in FIG. 9, front and back walls 111 and 113, left and right side walls 115 and 117, and top and bottom side walls 119 and 121 define a primary compartment 127 for receiving a notebook computer 120 or the like. A single handle 129 is mounted centrally on the top side wall 119 in any conventional manner to provide a hand grip for carrying the case 110.

Suspension system 133 depends downwardly from an upper portion of back wall 113 into the primary compartment 127 to form an elastic sling or pouch therein to hold the computer 120. In addition to suspension system 133, an elongate container 131 is positioned laterally of suspension system 133 within the primary compartment 127 to limit lateral movement of the computer 20 and to more efficiently utilize the primary compartment 127 for storage.

Suspension system 133 includes a hinged panel 135 hung from an upper portion of back wall 113, a movable panel 137, and an elastic panel 139 connected between the hinged and movable panels 135 and 137. One or more pairs of mating strap members 141 and 143 are mounted on the movable panel 137 and an upper portion of back wall 113, respectively, to form an elastic sling when connected as shown in FIG. 9. When strap members 141 and 143 are mated, suspension system 133 depends downwardly from an upper portion of back wall 113 into the primary compartment 127 defined within carrying case 110. Like panels 35 and 37 in carrying case 10, hinged and movable panels 135 and 137 each include a rigid or semi-rigid rectangular stiffener 136 encased in a fabric covering 138 and are sewn or affixed in any conventional manner to elastic panel 139, which is the same as elastic panel 39 previously described. The width and height of the hinged and movable panels 135 and 137 and elastic panel 139 are chosen such that when strap members 141 and 143 are mated, elastic panel 139 defines the bottom of the sling when the case 110 is in an upright position as shown in FIG. 9.

In use, back wall 113 is laid against a horizontal surface, zipper 125 is opened, and front wall 111 is rotated on hinge 123 to provide access to an interior of carrying case 110. If mated, strap members 141 and 143 are disconnected as shown in FIG. 10, and the movable panel 137 is draped away from the hinged panel 135 so that the suspension system 133 lays essentially flat. The notebook computer 120 is laid on top of the suspension system 133 with the computer cover facing away from back wall 113, and the movable panel 137 of suspension system 133 draped over the cover of notebook computer 120 towards the hinged panel 135. If mating strap members 141 and 143 are adjustable, they can be shortened or lengthened to accept notebook computer 120 while maintaining a minimum gap between the bottom edge of the computer and the bottom side wall 121 of the carrying case 110. Once adjusted, mating strap members 141 and 143 are mated together to hold the computer within the suspension system 133. Front wall 111 is then rotated to its closed position and zippered closed so that carrying case 110 can be grasped using handle 129.

The elastic characteristics and dimensions of the elastic panel 139 are chosen so that the lowermost surface or edge of a typical notebook computer disposed within the suspension system 133 is normally spaced above the bottom wall 121 so that an open space 145 of about three inches is maintained. If carrying case 110 with a notebook computer held therein is set down roughly, elastic panel 139 is capable of stretching to absorb the shock and impact which would otherwise be experienced by the notebook computer.

With back wall 113 resting against a horizontal surface, it is possible to open the carrying case 110 to use the notebook computer 120 disposed therein. Mating strap members 141 and 143 are simply disconnected, and the movable panel 137 draped away from the computer cover so that the computer 120 can be used in place within carrying case 110 in a manner similar to that previously described in connection with carrying case 10.

Lateral isolation is improved when the elongate container 131 or any similarly sized storage member is nested in the space between suspension system 133 and the side walls of the carrying case 110. Since many notebook and subnotebook computers are often less than twelve inches in width, a substantial gap between left and right side walls of a conventionally sized briefcase, attache or other carrying case is usually available to accommodate such a container. As best seen in FIG. 11, container 131 includes a generally rectangular body 147 with a zippered opening 149 dividing a top wall 150 and a pair of opposed end walls 152 and 153 intermediate a pair of longitudinal sidewalls 154 and 155. One or more strips of hook-and-loop fasteners 151 are secured to a bottom wall 156 of the rectangular body 147 for attachment to cooperating strips of hook-and-loop fasteners (not shown) carried on an inner surface of the back wall 113. The container 131 is useful for storing AC power adapters, expansion cards and other paraphernalia for effective use of the notebook computer. The walls making up the rectangular body 147 of the container 131 are formed of any suitable material, including synthetic nylon fabric or other durable materials, and are assembled by sewing, adhesives, or by other known techniques.

Figures 12, 13, 14:
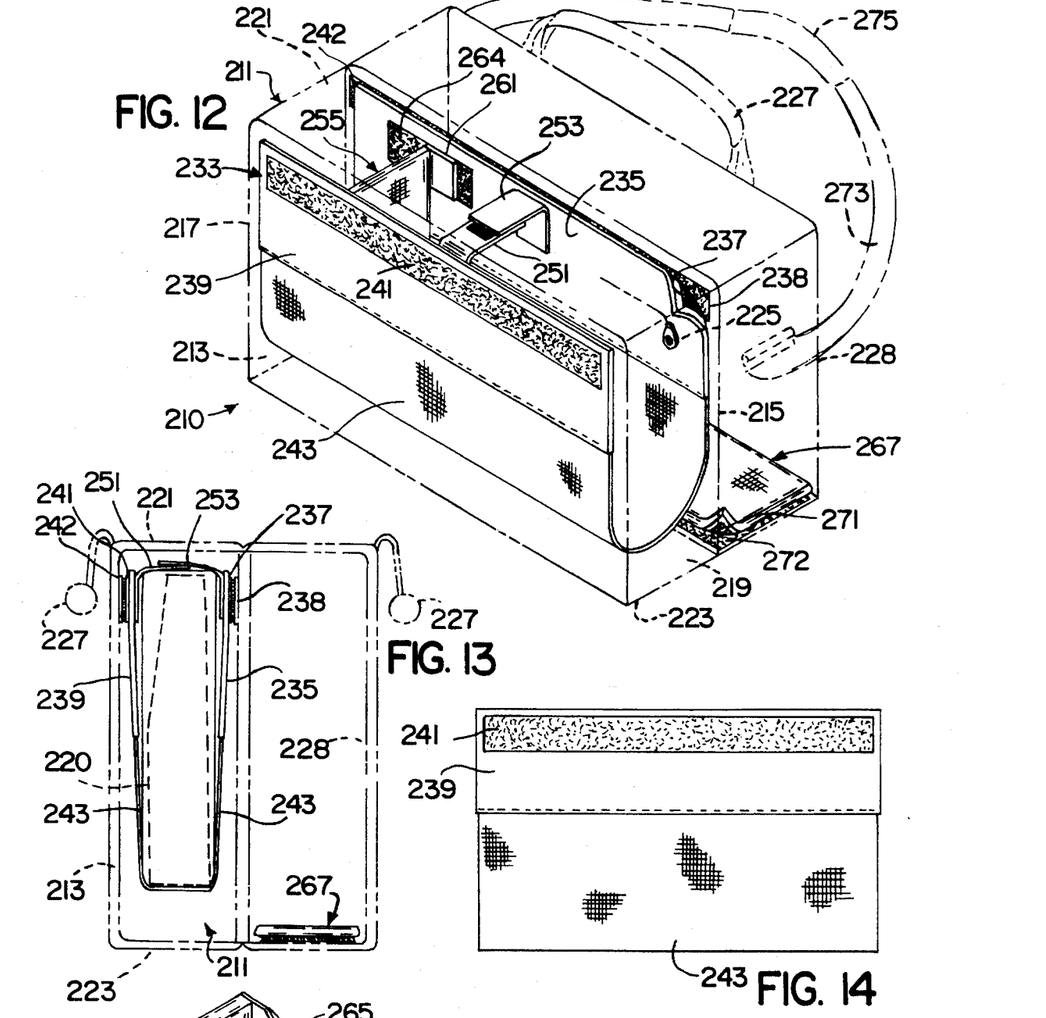
FIG. 12 is a perspective view of yet another modification of the carrying case according to the present invention.
FIG. 13 is a side view, partly in section, of the suspension system shown in FIG. 12.
FIG. 14 is a frontal view of the suspension system shown in FIG. 12.
Figure 15:
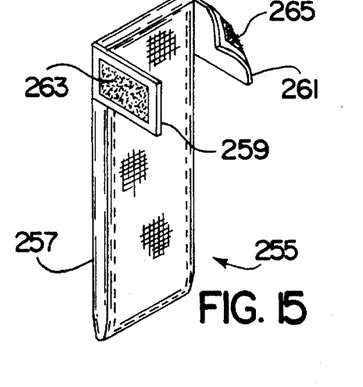
FIG. 15 is an enlarged perspective view of the vertical separator shown in FIG. 12.
Figure 16:
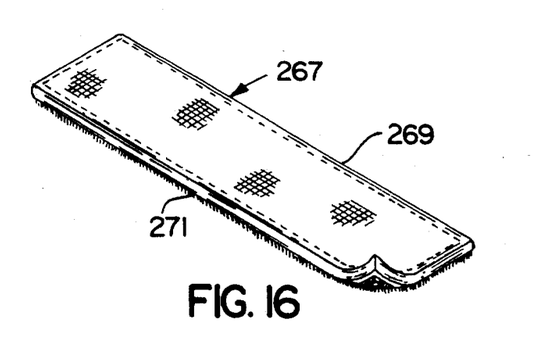
FIG. 16 is an enlarged perspective view of the floor stiffener shown in FIG. 12.

A further modification of the carrying case of the present invention is shown in FIGS. 12 and 13 wherein the suspension system is removably suspended between front and back walls of the case. The carrying case 210 includes a primary compartment 211 defined by stiffened front and back walls 213 and 215, left and right side walls 217 and 219 and top and bottom side walls 221 and 223. Primary compartment 211 includes a zippered opening 225 extending primarily along top side wall 221 as well as handles 227 secured to the front wall 213 and an oppositely disposed wall 228, respectively, for grasping with one hand to transport the carrying case 210. A suspension system 233 is disposed within primary compartment 211 and removably affixed between front and back walls 213 and 215. Suspension system 233 includes a first panel 235 provided with one or more strips of hook-and-loop fasteners 237 for attachment to cooperating strips of hook-and-loop fasteners 238 on back wall 215, a second panel 239 provided with one or more strips of hook-and-loop fasteners 241 for attachment to cooperating strips of hook-and-loop fasteners 242 on front wall 213, and an elastic panel 243 connected between bottom edges of the first and second panels 235 and 239. Together, first and second panels 235 and 239 and elastic panel 243 define an elastic cradle for receiving a notebook computer 220 or the like within primary compartment 211.

A pair of mating strap members 251 and 253 extending from upper edges of first and second panels 235 and 239, respectively, are used to secure the notebook computer 220 within suspension system 233. Additionally, a vertical separator 255 is removably positioned within the elastic cradle to prevent lateral movement of the notebook computer. The vertical separator 255 includes a vertical stiffening member 257, and two flexible tabs 259 and 261 extending from opposed longitudinal edges thereof to connect to inside surfaces of first and second panels 235 and 239 using one or more strips of hook-and-loop fasteners 263 and 265, respectively, to couple with cooperating strips of hook-and-loop fasteners 264 on first and second panels 235 and 239. A horizontal floor stiffener 267 is positioned as shown in FIGS. 12 and 13 to retain any compartment of the carrying case 210 in an expanded state. Horizontal floor stiffener 267 is preferably a rigid or semi-rigid rectangular panel 269 which is padded and encased by a fabric material and provided with one or more hook-and-loop fasteners 271 on a back face for attachment to cooperating strips of hook-and-loop fasteners 272 on the bottom side wall 223 of the carrying case 210.

A pair of opposed handles 227 and a shoulder strap 273 are generally secured to reinforced sections of the carrying case 210. Additionally, a shoulder pad 275 of generally arcuate configuration is provided intermediate the ends of the shoulder strap 273 to comfortably cradle the user's shoulder. The pad 275 preferably has an anti-slip surface which is wear resistant.

The removable nature by which first and second panels 235 and 239 are attached to front and back walls 213 and 215 allows the suspension unit 233 to be completely removed from primary compartment 211 by separating the strips of cooperating hook-and-loop fasteners so that the carrying case 210 can be converted for uses other than transporting sensitive equipment such as notebook computers. With suspension system 233 installed, however, the carrying case 210 functions to support the notebook computer 220 within an elastic cradle spaced above bottom side wall 223, thereby absorbing any shock which would otherwise occur due to the carrying case being abruptly set down.

Figure 17:
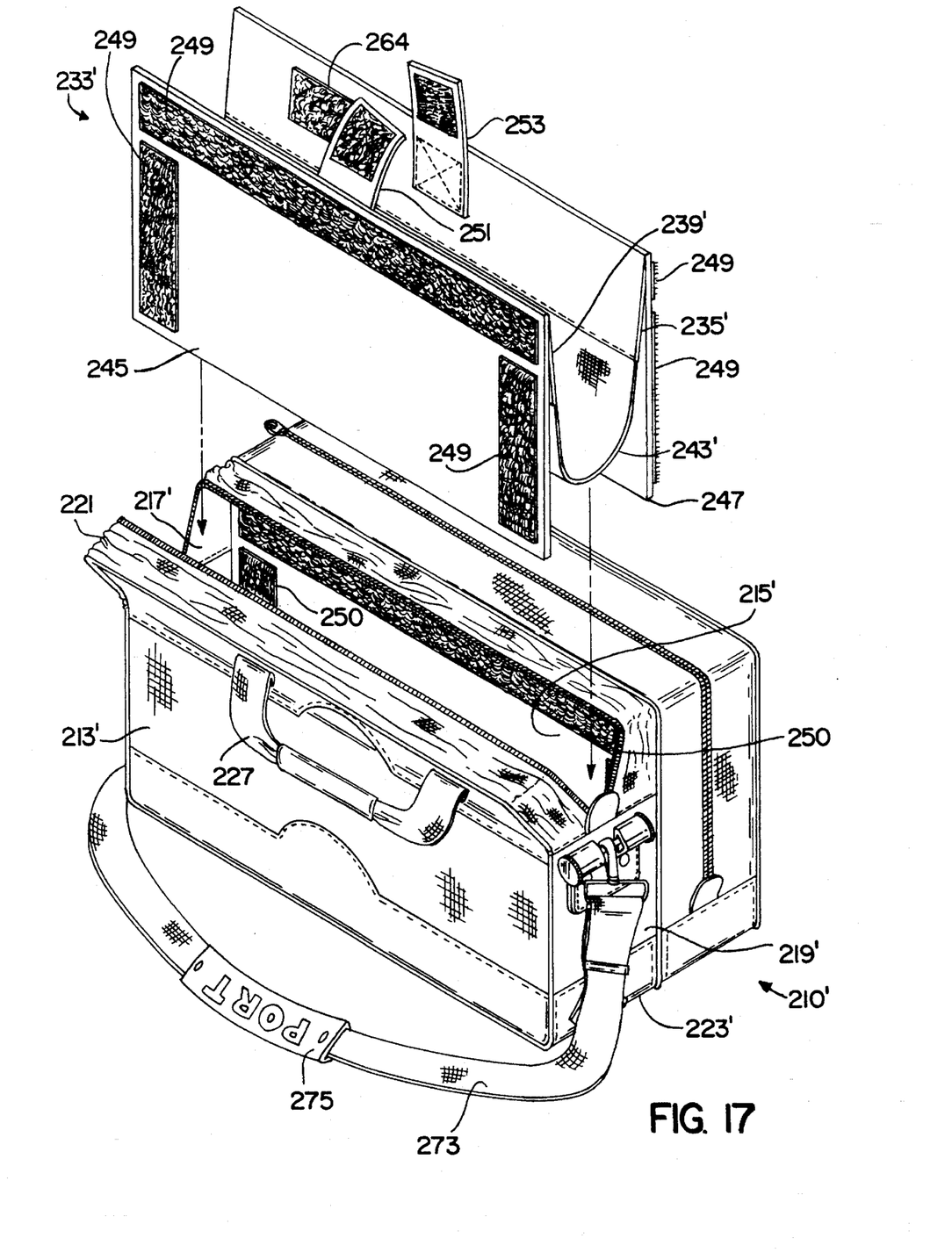
FIG. 17 is an exploded perspective view of a further modification of the carrying case of FIG. 12.
Figure 18:
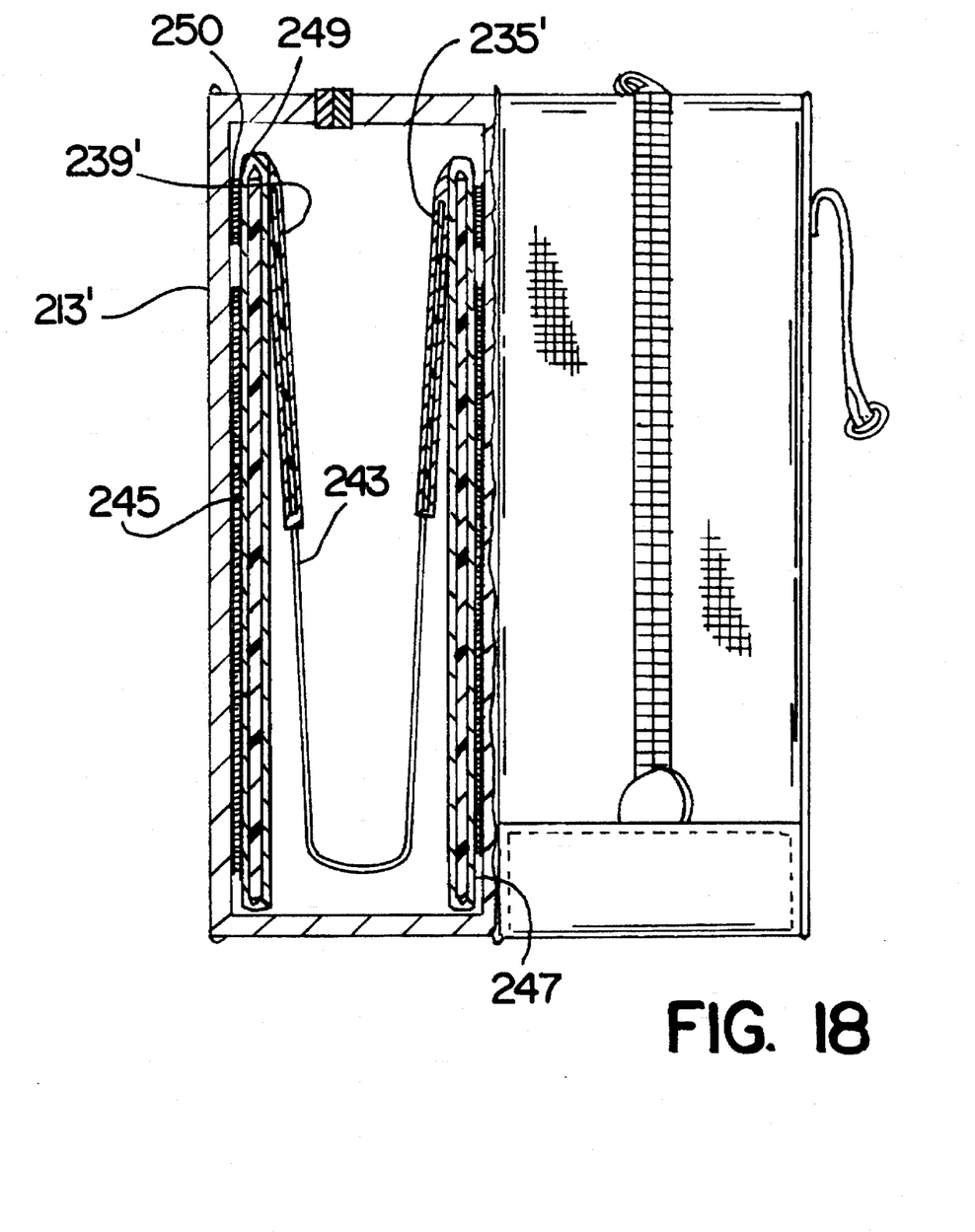
FIG. 18 is a sectional end view of the carrying case of FIG. 17 in an assembled condition.

In a further modification of the carrying case of the present invention shown in FIGS. 17 and 18, the carrying case 210' includes normally unstiffened and flexible front and back walls 213' and 215', left and right side walls 217' and 219', and top and bottom side walls 221' and 223'. A pair of fabric-covered stiffening inserts 245 and 247 are generally the same size and shape as the unstiffened front and back walls 213' and 215' and are releasably connected to the unstiffened front and back walls 213' and 215', respectively, using cooperating strips of hook-and-loop fasteners 249 and 250. A pair of unstiffened fabric panels 235' and 239' are sewn or affixed in any conventional manner to upper portions of the stiffening inserts 245 and 247, respectively, and together with elastic panel 243' suspended therebetween, define an elastic cradle for receiving a notebook computer or the like in the manner previously described in connection with carrying case 210. The stiffening inserts 245 and 247 ensure that the bottom edge of the computer held within the case 210' is normally spaced above the bottom side wall 223' of the carrying case and, when removed, convert the carrying case to a soft-sided bag. The remaining features of the carrying case 210' are the same as those previously described in connection with carrying case 210.

From the above, it will be appreciated that the carrying case of the present invention can be used to elastically support and protect a notebook computer during transport while at the same time providing one or more of the functions of allowing the computer to be used within the case, adjusting to accommodate computers and other objects of varying size and weight and converting for use in transporting objects which do not require being elastically supported. As used herein, "notebook" computer refers to any personal computer so reduced in size and weight as to be conveniently carried and employed while traveling, and while the present invention is particularly suited to transporting such devices, it may be used to transport any other delicate object which will fit within the primary compartment of the case. By "use" of the computer within the case is meant that the computer screen can be elevated and viewed and the keyboard accessed without removing the computer from the case, and when the case is employed to allow use of the computer within the case, the suspension system depends from one wall of the case opposite a pivoted wall. By "conversion" of the carrying case of the present invention is meant the ability to remove the suspension system from a primary computer compartment to make available all space defined therein, and when the carrying case is convertible the suspension system is suspended between spaced opposed walls or stiffening inserts held within the case using releasable fasteners. By "adjustment" is meant the ability to change the depth of the elastic cradle to accommodate computers and other delicate instruments of various sizes.

Construction of the carrying case of the present invention is generally conventional where not indicated otherwise. In general, the various compartments and panels are formed of suitable synthetic nylon fabrics or other durable materials, reinforced by stiffeners or a rigid frame. The components of each case can be assembled by sewing, by adhesives, by both, or by other known techniques.

The carrying case of the present invention can resemble in exterior shape and hardware any conventional carrying case having at least one compartment with front and back walls, such as a briefcase, attache, portfolio, overnight bag or knapsack. As used herein, "hardware" refers to hinges, zippers, latches and the like, which join the various walls of the case together. Where mating straps are used to hold the computer within the suspension system, these straps can be of any type commonly known in the art, including but not limited to nylon straps with cooperating strips of hook-and-loop fasteners or belts with latching buckles.

Brackets for supporting the bottom edge of a computer can be carried on a single panel as described or on separate panels elastically suspended from the back wall or opposed side walls. When carried by separate panels on opposed side walls, the brackets preferably extend perpendicularly from the opposed sidewalls into the primary computer compartment and are elastically suspended above the bottom side wall. When the carrying case of the present invention is convertible, stiffening inserts can be releasably connected to front and back walls as described, to pairs of opposed side walls, or to any combination of side walls and front and back walls to support the elastic cradle therebetween. Further, the suspension system of the present invention is not limited to using elastic panels connected between rigid or semi-rigid panels, but may also include slings constructed entirely of an elastic fabric, a rigid bottom support suspended with elastic panels, or any combination of elastic and rigid or semi-rigid panels.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. A carrying case for a notebook computer comprising a pair of opposed walls connected by one or more sidewalls to define a principal compartment for receiving the notebook computer; and suspension means, depending downwardly from an upper portion of one of said opposed walls into said principal compartment, for elastically suspending the notebook computer, wherein said suspension means includes a flap having a hinged end secured to said upper portion, a free end depending downward from said hinged end, and at least one of upper and lower supports carried on said flap to hold the notebook computer.

2. A carrying case as recited in claim 1 wherein said flap carries both upper and lower supports.

3. A carrying case as recited in claim 2 wherein said flap includes an elastic panel disposed between said upper and lower supports.

4. A carrying case as recited in claim 2 wherein said upper support includes two laterally spaced brackets for cradling corners of the notebook computer.

5. A carrying case as recited in claim 4 wherein said laterally spaced brackets each include a base and two perpendicularly extending flanges to bear against adjacent sides of a corner of the notebook computer.

6. A carrying case as recited in claim 5 wherein an upper portion of said flap is a stiffened panel and said laterally spaced brackets are attached to said stiffened panel using cooperating strips of hook-and-loop fasteners.

7. A carrying case as recited in claim 2 wherein said lower support includes at least one perpendicularly extending tab to support a bottom edge of the notebook computer.

8. A carrying case as recited in claim 7 wherein a lower portion of said flap is a stiffened panel and said perpendicularly extending tab is carried by said stiffened panel.

9. A carrying case as recited in claim 2 and further comprising a pair of mating strap members to hold the notebook computer within said upper and lower supports.

10. A carrying case for a notebook computer comprising a pair of opposed walls connected by one or more sidewalls to define a principal compartment for receiving the notebook computer; and suspension means, depending downwardly from an upper portion of one of said opposed walls into said principal compartment, for elastically suspending the notebook computer, wherein said suspension means is an elastic sling and wherein said sling includes a pair of stiffened panels and an elastic panel connected between said pair of stiffened panels.

11. A carrying case as recited in claim 10 wherein one of said stiffened panels is hinged to said upper portion of one of said opposed walls and further comprising coupling means for releasably connecting the other of said panels to said upper portion.

12. A carrying case as recited in claim 11 wherein said coupling means includes one or more pairs of mating strap members.

13. A carrying case as recited in claim 12 wherein said mating strap members include male and female clasps attached to respective opposed free ends of said straps.

14. A carrying case as recited in claim 13 wherein the length of said straps is adjustable.

15. A carrying case for a notebook computer comprising a pair of opposed walls connected by one or more side walls to define therebetween a primary compartment for receiving the notebook computer; and a suspension system including an elastic panel releasably suspended between said opposed walls to define a shock-absorbing cradle for receiving the notebook computer, wherein said suspension system further includes a first panel releasably connected to one of said opposed walls, and a second panel releasably connected to the other of said opposed walls, said elastic panel being connected between bottom edges of said first and second panels to define said shock-absorbing cradle.

16. A carrying case as recited in claim 15 wherein said panels are each releasably connected to a respective one of said opposed walls with cooperating strips of hook-and-loop fasteners.

17. A carrying case as recited in claim 15 wherein said first and second panels include stiffening members.

18. A carrying case as recited in claim 17 wherein said stiffening members are encased in fabric.

19. A carrying case as recited in claim 15 and further comprising a vertical separator including an elongate stiffener and two flexible tabs extending from opposite longitudinal edges of said elongate stiffener, said flexible tabs having fasteners affixed thereto for releasably connecting said tabs to cooperating fasteners on said first and second panels, respectively.

20. A carrying case as recited in claim 19 wherein said fasteners are cooperating strips of hook-and-loop fasteners.

21. A carrying case as recited in claim 15 wherein said first and second panels are secured to a pair of stiffening inserts releasably connected to respective opposed walls of said primary compartment.

22. A carrying case as recited in claim 21 wherein said stiffening inserts are approximately the same shape and size as said opposed walls.

23. A carrying case for a notebook computer comprising a pair of opposed walls connected by one or more side walls to define therebetween a primary compartment for receiving the notebook computer;

a suspension system including an elastic panel releasably suspended between said opposed walls to define a shock-absorbing cradle for receiving the notebook computer; and a horizontal stiffener to maintain said primary computer compartment in an expanded state, wherein said horizontal stiffener includes one or more fasteners for releasably connecting said horizontal stiffener to a bottom side wall of said primary compartment and said fasteners are cooperating strips of hook-and-loop fasteners.

24. A carrying case for a notebook computer comprising a pair of opposed walls connected by one or more side walls to define therebetween a primary compartment for receiving the notebook computer;

a suspension system including an elastic panel releasable suspended between said opposed walls to define a shock-absorbing cradle for receiving the notebook computer; and a pair of stiffening inserts each of which is releasably connected to one of said opposed walls of said primary compartment, respectively, to support opposed ends of said suspension system.

25. A carrying case as recited in claim 23 wherein said stiffening inserts are releasably connected to said opposed walls with cooperating strips of hook-and-loop fasteners.

* * * * *